United States Patent
Kitahara et al.

(10) Patent No.: US 10,244,078 B2
(45) Date of Patent: Mar. 26, 2019

(54) INFORMATION PROCESSING APPARATUS, INFORMATION PROCESSING METHOD, AND PROGRAM

(71) Applicant: SATURN LICENSING, LLC, New York, NY (US)

(72) Inventors: Jun Kitahara, Saitama (JP); Naohisa Kitazato, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 98 days.

(21) Appl. No.: 14/347,319

(22) PCT Filed: Oct. 29, 2012

(86) PCT No.: PCT/JP2012/006903
§ 371 (c)(1),
(2) Date: Mar. 26, 2014

(87) PCT Pub. No.: WO2013/065278
PCT Pub. Date: May 10, 2013

(65) Prior Publication Data
US 2015/0052224 A1  Feb. 19, 2015

(30) Foreign Application Priority Data
Nov. 2, 2011  (JP) .................. 2011-241388

(51) Int. Cl.
*G06F 15/16* (2006.01)
*H04L 29/08* (2006.01)
(Continued)

(52) U.S. Cl.
CPC .......... *H04L 67/327* (2013.01); *H04H 20/08* (2013.01); *H04H 20/93* (2013.01); *H04L 12/18* (2013.01);
(Continued)

(58) Field of Classification Search
CPC ....... H04L 67/327; H04L 12/18; H04H 20/93; H04H 2201/40; H04N 21/2353;
(Continued)

(56) References Cited

U.S. PATENT DOCUMENTS 6,381,507 B1 * 4/2002 Shima ................ G05B 19/0426
700/83
7,275,243 B2 * 9/2007 Gibbons .................. G06F 8/61
707/E17.116
(Continued)

FOREIGN PATENT DOCUMENTS

EP     1349376 A2   10/2003
EP     1672637 A1    6/2006
(Continued)

OTHER PUBLICATIONS

International Search Report dated Jan. 8, 2013 in PCT/JP2012/006903.

(Continued)

*Primary Examiner* — Michael Won
(74) *Attorney, Agent, or Firm* — Oblon, McClelland, Maier & Neustadt, L.L.P.

(57) ABSTRACT

[Object] To support transfer of an application to an external device in an apparatus that performs a control of the application using an AIT.
[Solving Means] An application destination descriptor (Application_destination_discriptor) for specifying a corresponding device of an application is newly provided as an application descriptor of an AIT. An information processing apparatus determines based on this application destination descriptor whether or not the application is an application for its own device or an application for an external device. If the application is the application for the external device, (Continued)

the information processing apparatus transfers the application to the external device to start it.

13 Claims, 15 Drawing Sheets

(51) Int. Cl.
| | |
|---|---|
| H04H 20/08 | (2008.01) |
| H04H 20/93 | (2008.01) |
| H04N 21/235 | (2011.01) |
| H04N 21/2362 | (2011.01) |
| H04N 21/41 | (2011.01) |
| H04N 21/434 | (2011.01) |
| H04N 21/81 | (2011.01) |
| H04N 21/845 | (2011.01) |
| H04L 12/18 | (2006.01) |
| H04N 21/6332 | (2011.01) |

(52) U.S. Cl.
CPC ..... *H04N 21/2353* (2013.01); *H04N 21/2362* (2013.01); *H04N 21/4126* (2013.01); *H04N 21/4345* (2013.01); *H04N 21/6332* (2013.01); *H04N 21/8186* (2013.01); *H04N 21/8453* (2013.01); *H04N 2201/40* (2013.01)

(58) Field of Classification Search
CPC ........... H04N 21/2362; H04N 21/4126; H04N 21/4345; H04N 21/8086; H04N 21/8453
See application file for complete search history.

(56) References Cited

U.S. PATENT DOCUMENTS

| | | | |
|---|---|---|---|
| 7,469,140 B1* | 12/2008 | Papineau | H04L 67/04 455/412.1 |
| 8,595,186 B1* | 11/2013 | Mandyam | G06F 8/38 707/632 |
| 9,110,581 B2* | 8/2015 | Momchilov | G06F 3/038 |
| 9,213,729 B2* | 12/2015 | Li | G06F 17/30312 |
| 2002/0157006 A1* | 10/2002 | Narishima et al. | 713/177 |
| 2003/0204858 A1* | 10/2003 | Nakamura | 725/151 |
| 2006/0206863 A1* | 9/2006 | Shenfield et al. | 717/107 |
| 2006/0282773 A1* | 12/2006 | Kim | G06F 9/44505 715/703 |
| 2007/0053291 A1* | 3/2007 | Hiltunen et al. | 370/233 |
| 2007/0192818 A1* | 8/2007 | Bourges-Sevenier | H04L 12/2803 725/132 |
| 2008/0097919 A1* | 4/2008 | Szucs | G06F 21/10 705/52 |
| 2009/0055875 A1* | 2/2009 | Lee et al. | 725/62 |
| 2009/0249326 A1* | 10/2009 | Ridley | G06F 8/61 717/174 |
| 2009/0288125 A1* | 11/2009 | Morioka | H04N 7/1675 725/110 |
| 2010/0067035 A1 | 3/2010 | Kawakubo et al. | |
| 2011/0231870 A1* | 9/2011 | Hartung | H04N 21/4345 725/25 |
| 2011/0314051 A1* | 12/2011 | Cavet | G06F 17/30017 707/769 |
| 2012/0151079 A1* | 6/2012 | Besehanic | H04H 60/74 709/231 |
| 2013/0185292 A1* | 7/2013 | Li | G06F 17/30522 707/723 |
| 2013/0219447 A1* | 8/2013 | Dewa et al. | 725/118 |
| 2013/0312059 A1* | 11/2013 | Otsuki | H04H 60/13 726/1 |
| 2014/0040424 A1* | 2/2014 | Keum | H04L 67/10 709/217 |
| 2014/0040963 A1* | 2/2014 | Keum et al. | 725/78 |
| 2014/0090000 A1* | 3/2014 | Takechi et al. | 725/110 |
| 2014/0140213 A1* | 5/2014 | Raleigh | H04L 67/2804 370/235 |
| 2014/0173673 A1* | 6/2014 | Kitahara et al. | 725/109 |
| 2014/0181887 A1* | 6/2014 | Moon | H04N 21/23617 725/133 |
| 2014/0201800 A1* | 7/2014 | Kitahara et al. | 725/116 |
| 2014/0237529 A1* | 8/2014 | Kitahara et al. | 725/109 |
| 2014/0279768 A1* | 9/2014 | Rash | G06N 5/02 706/14 |
| 2014/0280889 A1* | 9/2014 | Nispel | H04L 43/04 709/224 |
| 2014/0310402 A1* | 10/2014 | Giaretta | H04L 47/2441 709/224 |
| 2014/0331250 A1* | 11/2014 | Kitahara et al. | 725/25 |
| 2014/0344884 A1* | 11/2014 | Kitahara et al. | 725/116 |
| 2015/0052224 A1* | 2/2015 | Kitahara et al. | 709/219 |
| 2015/0350355 A1* | 12/2015 | Linn | H04L 67/22 709/217 |
| 2015/0373084 A1* | 12/2015 | Krochmal | H04L 67/22 709/217 |
| 2016/0029153 A1* | 1/2016 | Linn | H04W 4/008 455/41.1 |
| 2016/0034267 A1* | 2/2016 | Wetzold | G06F 8/71 717/172 |
| 2016/0165303 A1* | 6/2016 | Kang | H04N 7/08 725/80 |
| 2017/0093891 A1* | 3/2017 | Mitchell | H04L 63/1416 |

FOREIGN PATENT DOCUMENTS

| | | |
|---|---|---|
| EP | 1818907 A1 | 8/2007 |
| EP | 2 343 881 | 7/2011 |
| EP | 2479987 A1 | 7/2012 |
| JP | 2003-506971 A | 2/2003 |
| JP | 2004-356697 A | 12/2004 |
| JP | 2011-166441 A | 8/2011 |
| WO | WO 2011/033730 A1 | 3/2011 |
| WO | WO 2011/037359 | 3/2011 |

OTHER PUBLICATIONS

"ETSI TS 102 796, Hybrid Broadcast Broadband TV" ETSI, vol. 1.1.1, Jun. 2010, 75 Pages http://www.etsi.org/deliver/etsi_ts/102700_102799/102796/01.01.01_60/ts_102796v010101p.pdf.

"Application Execution Engine Platform for Digital Broadcasting" ARIB, Association of Radio Industries and Businesses, vol. STD-B23 1.2, Jun. 29, 2009, 557 Pages http://www.arib.or.jp/english/html/overview/doc/2-STD-B23v1_2.pdf.

Extended European Search Report dated Mar. 26, 2015 in European Patent Application No. 12845976.5.

ETSI:"ETSI TS 102 809 V1.1.1 Digital Video Broadcasting (DVB): Signalling and carriage of interactive applications and services in Hybrid broadcast/broadband environments," Jan. 7, 2010, XP055120418, pp. 1-98, URL: http://www.etsi.org/deliver/etsi_ts/102800_102809/102809/01.01._60/ts_102809v010101p.pdf, retrieved on May 27, 2014.

Summons to Oral Hearing issued in corresponding European Patent Application No. 12845976.5 dated Dec. 7, 2017, 12 pages.

\* cited by examiner

| | No. of bits | Identifier |
|---|---|---|
| application_information_section() { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   test_application_flag | 1 | bslbf |
|   application_type | 15 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   common_descriptors_length | 12 | uimsbf |
|   for(i=0;i<N;i++){ | | |
|     descriptor() | | |
|   } | | |
|   reserved_future_use | 4 | bslbf |
|   application_loop_length | 12 | uimsbf |
|   for(i=0;i<N;i++){ | | |
|     application_identifier() | | |
|     application_control_code | 8 | uimsbf |
|     reserved_future_use | 4 | bslbf |
|     application_descriptors_loop_length | 12 | uimsbf |
|     for(j=0;j<N;j++){ | | |
|       descriptor() | | |
|     } | | |
|   } | | |
|   CRC_32 | 32 | rpchof |
| } | | |

FIG.2 application destination descriptor

| | No. of Bits | Identifier |
|---|---|---|
| application_destination_descriptor() { | | |
| descriptor_tag | 8 | uimsbf |
| destination_device_type | 8 | uimsbf |
| } | | |

FIG.3 application validity period descriptor

| | No. of Bits | Identifier |
|---|---|---|
| application_validity_period_descriptor() { | | |
| descriptor_tag | 8 | uimsbf |
| validity_period_format | 8 | uimsbf |
| validity_period_length | 8 | uimsbf |
| for(i=0; i<N; i++) { | | |
| validity_period_byte | 8 | uimsbf |
| } | | |
| } | | |

FIG.4

| Field | | Description |
|---|---|---|
| appName | | Application name |
| applicationIdentifier | | ID for uniquely identifying application |
| applicationDescriptor | | General-purpose descriptor common to applications |
| | type | Specifying application type |
| | controlCode | Specifying value of application control code |
| | visibility | Specifying visibility of application |
| | serviceBound | Flag indicating whether or not it is active only in current service |
| | priority | Indicating priority of application |
| | version | Version of application |
| | mhpVersion | Version corresponding to platform profile |
| | icon | Specifying icon |
| | storageCapability | Capability of storage function |
| applicationTransport | | Transport protocol descriptor |
| applicationLocation | | Application location descriptor |
| applicationBoundary | | Application boundary descriptor |
| applicationSpecificDescriptor | | Application specific descriptor |
| applicationUsageDescriptor | | Application usage descriptor |

FIG. 5

| Code | Identification name | Meaning |
|---|---|---|
| 0x00 | | reserved_future_use |
| 0x01 | AUTOSTART | Application automatically starts when service is selected. (Except for case where application is being already executed) |
| 0x02 | PRESENT | Indicating that application is executable while service is selected. Note that it does not automatically start. |
| 0x03 | DESTROY | Application terminates processing. |
| 0x04 | KILL | Application immediately terminates processing. |
| 0x05 | PREFETCH | Application file group is cashed if receiver can do. Application does not start. |
| 0x06 | REMOTE | Indicating that application is not present in current transport stream and can be acquired if another stream is selected. |
| 0x07 | DISABLED | Indicating that application cannot start. |
| 0x08 | PLAYBACK_AUTOSTART | Application starts in the same manner as AUTOSTART if receiver performs reproduction from storage apparatus. |
| 0x09 to 0xFF | | reserved_future_use |

FIG.6

INFORMATION PROCESSING APPARATUS, INFORMATION PROCESSING METHOD, AND PROGRAM

TECHNICAL FIELD

The present technology relates to an information processing apparatus, an information processing method, and a program, by which an application related to broadcast content can be executed using an application management table.

BACKGROUND ART

In recent years, there is known a technique that enables reproduction of broadcast content and execution of an application delivered via a network such as the Internet to be performed at the same time. As such a technique, a technique called hybrid broadcast broadband TV (hereinafter, referred to as "HbbTV") is known. As a standard of HbbTV, "ETSI TS 102 796" (see Non-patent Document 1) has been developed in Europe. Further, the standard "ARIB STD-B23" (see Non-patent Document 2) conforming thereto has been developed also in our country.

Non-Patent Document 1: ETSI (European Telecommunications Standards Institute) "ETSI TS 102 796 V1.1.1 (2010-06)" http://www.etsi.org/deliver/etsi_ts/ 102700_102799/102796/01.01.01_60/ ts_102796v010101p.pdf (browsed on Oct. 21, 2011)

Non-Patent Document 2: Association of Radio Industries and Businesses "Application execution environment standard ARIB STD-B23 1.2 in digital broadcast" http:// www.arib.or.jp/english/html/overview/doc/2-STD-B23v1_2.pdf (browsed on Oct. 21, 2011)

SUMMARY OF INVENTION

Problem to be Solved by the Invention

For example, as in HbbTV, in a system in which reproduction of broadcast content and execution of an application are performed at the same time, a life cycle from the start to the end of the application is managed by a data structure called application information table (AIT) superimposed on the broadcast content. An information terminal that has acquired the AIT performs a control of the application based on a code for an application control that is included in the AIT.

However, in the conventional transmission of information on the application using the AIT, it is assumed that a receiver that has directly received the AIT receives and uses the application. Thus, a case where the application is moved from the receiver to an external device and used is not assumed. The receiver that receives the application and a device connected thereto may be different in conditions of, for example, an execution environment such as an operating system and a screen size. Therefore, even if the application can be moved from the receiver to the device connected thereto, the application does not necessarily operate on the device. Otherwise, even if the application operates, there has been a problem that presentation of the application according to the intention of a producer of the application cannot be performed.

Further, in the conventional transmission of the information on the application using the AIT, a period when the application stored in a recording apparatus inside the receiver is to be used is not described. Therefore, the receiver does not know an appropriate timing to delete the application. Thus, there is a possibility that the application being still recorded as it is not used or the application having a possibility of being used is deleted.

In view of the above-mentioned circumstances, it is an object of the present technology to provide an information processing apparatus, an information processing method, and a program, by which a control of an application using an AIT can be extended. More specifically, it is an object thereof to provide an information processing apparatus, an information processing method, and a program, by which transfer of the application to the external device is supported. Further, it is an object thereof to provide an information processing apparatus, an information processing method, and a program, by which a management of a validity period of an application is supported.

Means for Solving the Problem

In order to solve the above-mentioned problems, an information processing apparatus according to the present technology includes: a connector that is connectable to an external device; a broadcast content processing unit that receives and processes broadcast content; and a controller that acquires an application information table in which an application destination descriptor for specifying a corresponding device of an application related to the broadcast content is set, and determines based on the application destination descriptor whether or not the application is an application corresponding to the external device connected to the connector.

The controller may transfer, when determining that the application is the application corresponding to the external device, the application to the external device connected to the connector.

The controller may convert, when determining that the application is the application corresponding to the external device, an application control code described in the acquired application information table into external device control information in a format executable when being interpret in an environment of the external device, and may transfer the converted application control code to the external device together with the application.

The controller may acquire an application information table in which an application validity period descriptor for specifying a validity period of the application is set, and may manage the validity period of the application based on the application validity period descriptor.

The controller may perform processing for deleting an application, the validity period of which has expired.

An information processing method according to the present technology includes: receiving and processing broadcast content; and acquiring, by a controller, an application information table in which an application destination descriptor for specifying a corresponding device of an application related to the reproduced broadcast content is set and determining based on the application destination descriptor whether or not the application is an application corresponding to a connected external device.

A program according to the present technology causes a computer to function as a controller that acquires an application information table in which an application destination descriptor for specifying a corresponding device of an application related to the broadcast content is set and determines based on the application destination descriptor whether or not the application is an application corresponding to a connected external device.

Effect of the Invention

As described above, according to the present technology, it is possible to extend a control of an application using an AIT.

BRIEF DESCRIPTION OF DRAWINGS

FIG. 2 A view showing a data structure of an AIT.
FIG. 3 A view showing a configuration of an application destination descriptor.
FIG. 4 A view showing a configuration of an application validity period descriptor.
FIG. 5 A view showing a data structure of an XML-AIT.
FIG. 6 A view showing definitions of application control codes stored in the AIT.

MODE(S) FOR CARRYING OUT THE INVENTION

Hereinafter, an embodiment of the present technology will be described with reference to the drawings.

First Embodiment

[Information Processing System]

Figure 1:
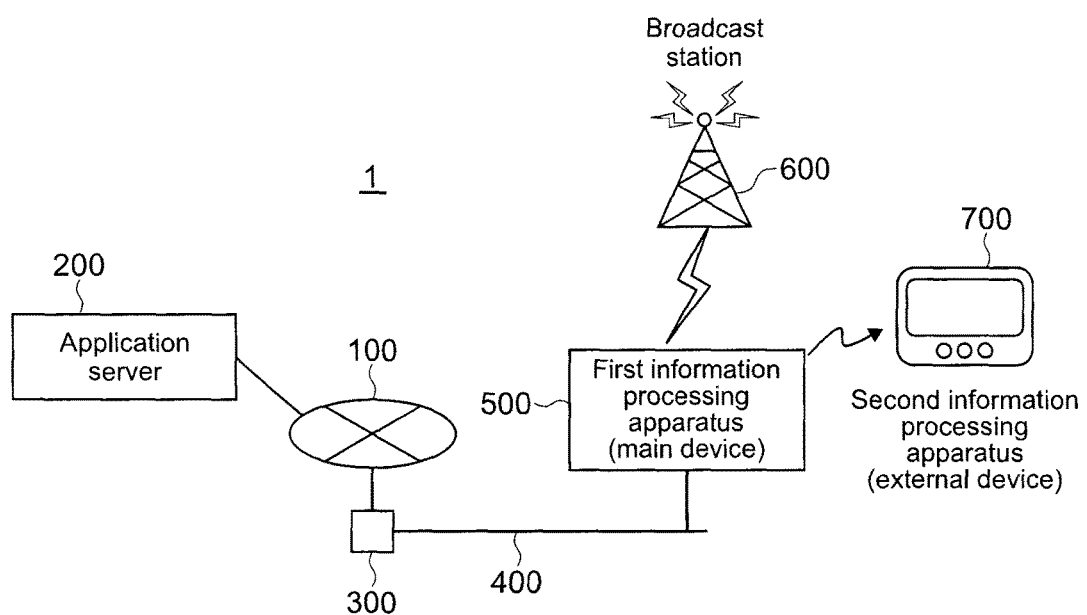
FIG. 1 A view showing an outline of an information processing system according to this embodiment.

FIG. 1 is a view showing an outline of an information processing system according to this embodiment.

An information processing system 1 according this embodiment includes a first network 100 such as the Internet, an application server 200, an edge router 300, a second network 400 such as a local area network (LAN), a first information processing apparatus 500, and a broadcast station 600. Further, a second information processing apparatus 700 can be connected to the first information processing apparatus 500 via an interface.

The broadcast station 600 sends digital broadcast signals via, for example, a communication medium such as a terrestrial network, a satellite network, and an internet protocol (IP) network. The broadcast station 600 is capable of multiplexing and sending stream packets of broadcast content, packets of an application concurrently executed in conjunction with reproduction of the broadcast content, and packets of program specific information/service information (PSI/SI) including the broadcast content being currently on the air and various types of information on the application. The PSI/SI includes an application information table (hereinafter, referred to as "AIT") or the like that is a data structure composed of information for managing the application.

The application server 200 is connectable to the first network 100 is capable of delivering, via the first network 100 to the first information processing apparatus 500, files of the application executed in conjunction with the reproduction of the broadcast content and an extensible markup language (XML)-AIT in which the data structure composed of the information for managing the application is described.

The edge router 300 is a router for connecting the first network 100 with the second network 400. The second network 400 may be wired or wireless.

The first information processing apparatus 500 and the second information processing apparatus 700 are, for example, a personal computer, a cellular phone, a smartphone, a television set, a game console, a tablet terminal, and an audio/video player. However, their product forms are not specifically limited.

The first information processing apparatus 500 is capable of receiving from the broadcast station 600 the digital broadcast signals and demodulating them to obtain a transport stream. The first information processing apparatus 500 is capable of demultiplexing from this transport stream the broadcast content and decoding the broadcast content, and outputting the decoded broadcast content to a display unit (not shown) and a speaker unit (not shown) or a recording apparatus that are connected to the first information processing apparatus 500. The first information processing apparatus 500 and the second information processing apparatus 700 are connected to be capable of communicating with each other via, for example, an wired interface such as a universal serial bus (USB) and a high-definition multimedia interface (HDMI) or a wireless interface such as an inter-apparatus wireless LAN such as a Wi-Fi (Registered trademark) Direct.

Note that, the display unit, the speaker unit, and the recording apparatus may be integral with the first information processing apparatus 500 or may be connected to the first information processing apparatus 500 directly or via the second network 400 as independent apparatuses. Alternatively, an apparatus (not shown) including the display unit and the speaker unit may be connected to the first information processing apparatus 500 directly or via the second network 400.

Further, the first information processing apparatus 500 is capable of extracting, from the obtained transport stream, the application and the PSI/SI including the AIT, and interpreting the AIT to perform a control of the application. The first information processing apparatus 500 is capable of combining, when the application is a visible application, video signals generated by execution of this application with video signals and subtitle signals of the broadcast content and outputting them to the display unit.

In addition, the first information processing apparatus 500 is capable of acquiring, via the first network 100, the edge router 300, and the second network 400, an application and a file of the XML-AIT from the application server 200 by downloading or the like. The first information processing apparatus 500 is capable of interpreting the acquired XML-AIT and controlling the application acquired from the application server 200.

In addition, the first information processing apparatus 500 is capable of transmitting, when acquiring an application for an external connection terminal, the application and control information for the start and end or the like of the application to the second information processing apparatus 700 via the interface.

The second information processing apparatus 700 is capable of receiving the application for the external connection terminal and the control information via the interface from the first information processing apparatus 500 and executing the application according to the control information.

[Application]

Now, applications will be described. The applications are provided by the broadcast station 600 and the application server 200 to the first information processing apparatus 500. The applications are constituted of, for example, an HTML document, a Java (Registered Trademark) script, a still image file, and a moving image file.

The application may be visible or invisible. The visible application means an application that the user can observe its state on a screen. The invisible application means an application that the user cannot observe its state on the screen. Regarding the invisible application, a function of recording information for identifying broadcast content viewed by information processing apparatuses and a viewing period of time and delivering them to a particular server for sweeps or the like is conceivable, for example.

Further, the application may be a bidirectional application whose information and functions to be presented can be changed according to user operations of the first information processing apparatus 500 or may be an application that presents information to the user in one direction.

The applications include an application for the first information processing apparatus optimized corresponding to an execution environment (operating system, screen size, and the like) of the first information processing apparatus 500 and an application for the second information processing apparatus optimized corresponding to a specification and an execution environment (operating system, screen size, and the like) of the second information processing apparatus 700. Thus, when, for the second information processing apparatus, various apparatuses different in specification and execution environment are assumed as corresponding apparatuses, information for identifying the corresponding apparatus of the application for the second information processing apparatus needs to be indicated using the AIT.

[Data Structures of AIT and XML-AIT]

Now, a data structure of the AIT provided by the broadcast station 600 and a data structure of the XML-AIT provided by the application server 200 will be described. Note that, the "AIT" simply described herein means the AIT provided by the broadcast station 600.

FIG. 2 is a view showing the data structure of the AIT.

An AIT 10 is a table in which various kinds of information on a broadcast-related application, application control codes for controlling the broadcast-related application, and the like are stored. Specifically, in the AIT 10, there are stored a table ID, a section syntax indicator, a section length, an application format, a version number, a current/next indicator, a section number, a last section number, a common descriptor loop length, an application information loop length, an application identifier, an application control code 11, an application descriptor loop length, an application descriptor 12, and the like.

For the application descriptor 12, two descriptors of an application destination descriptor (Application_destination_discriptor) and an application validity period descriptor (Application_validity_period_descriptor) can be defined.

FIG. 3 is a view showing a configuration of the application destination descriptor. In the application destination descriptor, a device type (destination_device_type) that is information for specifying a corresponding device of the application is described. When a main device (first information processing apparatus 500) is specified as the device type, a description of "main receiver" is made. When an external device (e.g., second information processing apparatus 700) is specified as the device type, a description other than the description of "main receiver" is made.

FIG. 4 is a view showing a structure of the application validity period descriptor. In the application validity period descriptor, a validity period format (validity_period_format) that is information for specifying a date of termination of a period when the application is usable and a date of termination (validity_period_length) of the period when the application is usable.

FIG. 5 is a view showing a data structure of the XML-AIT.

An XML-AIT 20 is a table in which various kinds of information on a broadcast-unrelated application, application control codes for controlling the broadcast-unrelated application, and the like are stored. Specifically, in the XML-AIT 20, there are stored an application name, an application identifier, an application descriptor 22, an application type, an application control code 21, a visibility of an application, a flag indicating whether or not it is active only in a current service, a priority of an application, a version of an application, a version suitable for a platform profile, an icon, a capability of a storage function, a transport protocol descriptor, an application location descriptor, an application boundary descriptor, an application specific descriptor, an application usage descriptor, and the like.

Also in the application descriptor 22 of the XML-AIT, two descriptors similar to the application destination descriptor and the application validity period descriptor can be described.

[Definition of Application Control Code]

A life cycle of an application is dynamically controlled by the first information processing apparatus 500 based on application control codes 11 and 21 stored in the AIT 10 and the XML-AIT 20.

FIG. 6 is a view showing definitions of the application control codes 11 and 21 stored in the AIT 10 and the XML-AIT 20.

As shown in the figure, as the application control codes, "AUTOSTART," "PRESENT," "DESTROY," "KILL," "PREFETCH," "REMOTE," "DISABLED," and "PLAYBACK_AUTOSTART" are present as a standard. In this embodiment, "SUSPEND" is newly added. Definitions of these application control codes are as follows.

"AUTOSTART" is a code indicating that an application automatically starts due to selection of a service. If the application is being already executed, it is not applied.

"PRESENT" is a code indicating that an application is executable while the service is selected. Note that a target application does not automatically start due to the selection of the service but starts in response to a start instruction from the user.

"DESTROY" is a code indicating a permission to terminate an application.

"KILL" is a code indicating a force-quiet of an application.

"PREFETCH" is a code indicating a cash of an application.

"REMOTE" is a code indicating that it is an application that cannot be acquired from a current transport stream. The application is acquired from another transport stream or cash and usable.

"DISABLED" is a code indicating that the start of an application is forbidden.

"PLAYBACK_AUTOSTART" is a code for starting an application along with reproduction of broadcast content recorded in storage (recording apparatus).

[Configuration of First Information Processing Apparatus]

Figure 7:
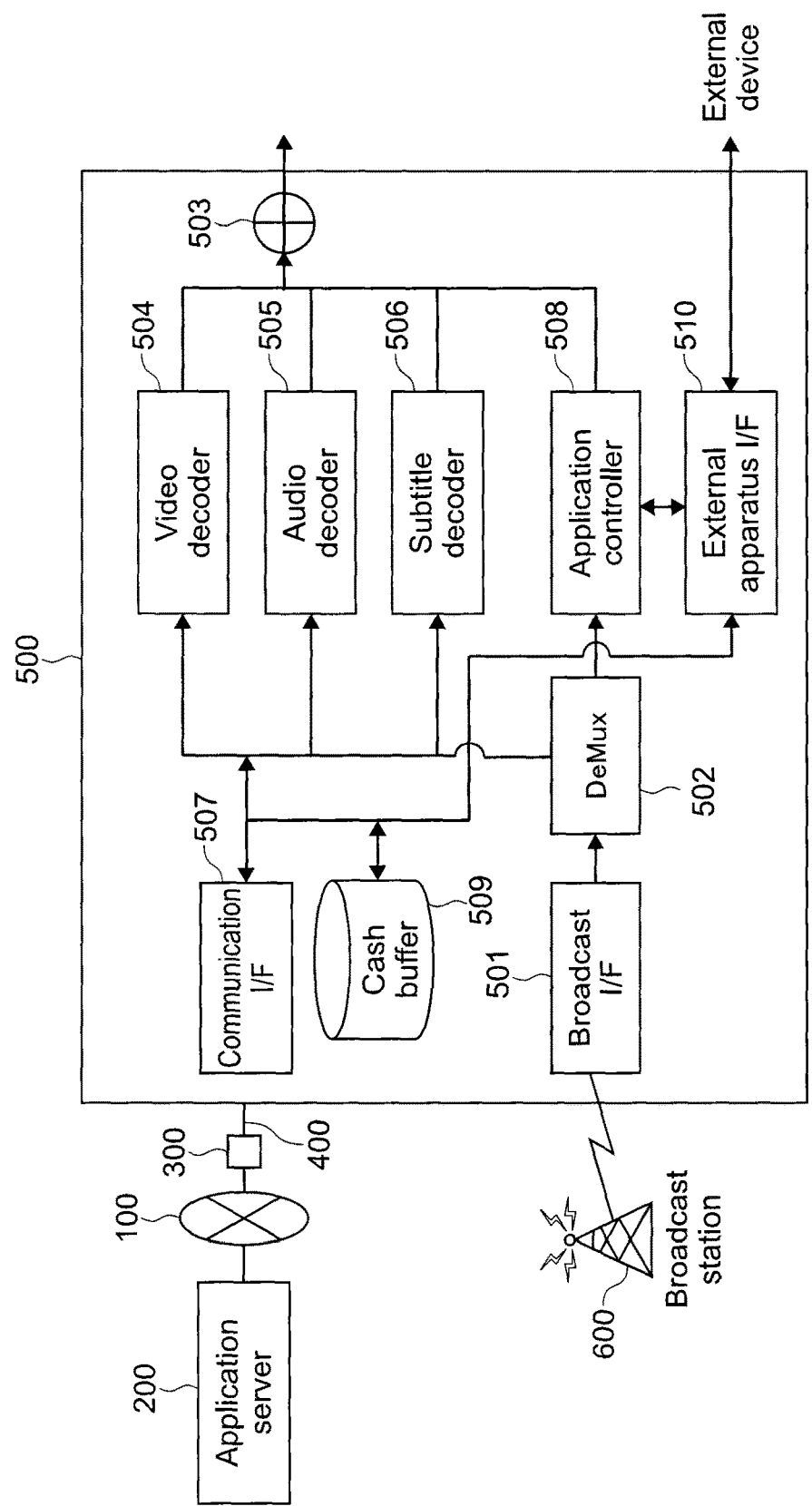
FIG. 7 A block diagram showing a configuration of an information processing apparatus (first information processing apparatus) according to this embodiment.

FIG. 7 is a block diagram showing a configuration of the first information processing apparatus 500 according to this embodiment.

The first information processing apparatus 500 includes a broadcast interface 501, a demultiplexer 502, an output processing unit 503, a video decoder 504, an audio decoder 505, a subtitle decoder 506, a communication interface 507, an application controller 508 (controller), a cash buffer 509, and an external apparatus interface 510 (connector).

The broadcast interface 501 includes an antenna and a tuner, and uses them for receiving digital broadcast signals of a channel selected by user. The broadcast interface 501 outputs a transport stream, which is obtained by subjecting the received digital broadcast signals to demodulating processing or the like, to the demultiplexer 502.

The demultiplexer 502 demultiplexes, from the transport stream, stream packets of broadcast content, packets of an application, and packets of an AIT. The demultiplexer 502 demultiplexes, from the stream packets of the broadcast content, a video elementary stream (ES), an audio ES, and a subtitle ES. The demultiplexer 502 distributes the video ES to the video decoder 504, the audio ES to the audio decoder 505, the subtitle ES to the subtitle decoder 506, and the packets of the application and packets of a program specific information/service information (PSI/SI) including the AIT to the controller 508.

The video decoder 504 decodes the video ES to generate video signals and outputs the generated video signals to the output processing unit 503. The audio decoder 505 decodes the audio ES to generate audio signals and outputs the generated audio signals to the output processing unit 503.

The subtitle decoder 506 decodes the subtitle ES to generate subtitle signals and outputs the generated subtitle signals to the output processing unit 503.

The broadcast interface 501, the demultiplexer 502, the output processing unit 503, the video decoder 504, the audio decoder 505, and the subtitle decoder 506 serve as a broadcast content processing unit that receives and processes broadcast content.

The communication interface 507 is an interface for performing a communication with an external apparatus via a second network 400 such as a LAN. The communication interface 507 may perform a wireless communication or a wired communication.

An application controller 508 is a controller that performs processing relating to control of applications.

The cash buffer 509 serves as a storage unit that temporarily stores acquired applications.

The output processing unit 503 combines the video signals from the video decoder 504, the audio signals from the audio decoder 505, the subtitle signals from the subtitle decoder 506, and the video signals, the audio signals, and the like from the application controller 508 and outputs them to the recording apparatus or the display unit and speaker unit (not shown) that are connected to the first information processing apparatus 500.

The external apparatus interface 510 is an interface for connecting to the second information processing apparatus 700.

Some or all of the components at least including the application controller 508 of the first information processing apparatus 500 can be provided by a computer including a central processing unit (CPU) and a memory and by programs.

[Configuration of Second Information Processing Apparatus (External Device)]

Figure 8:
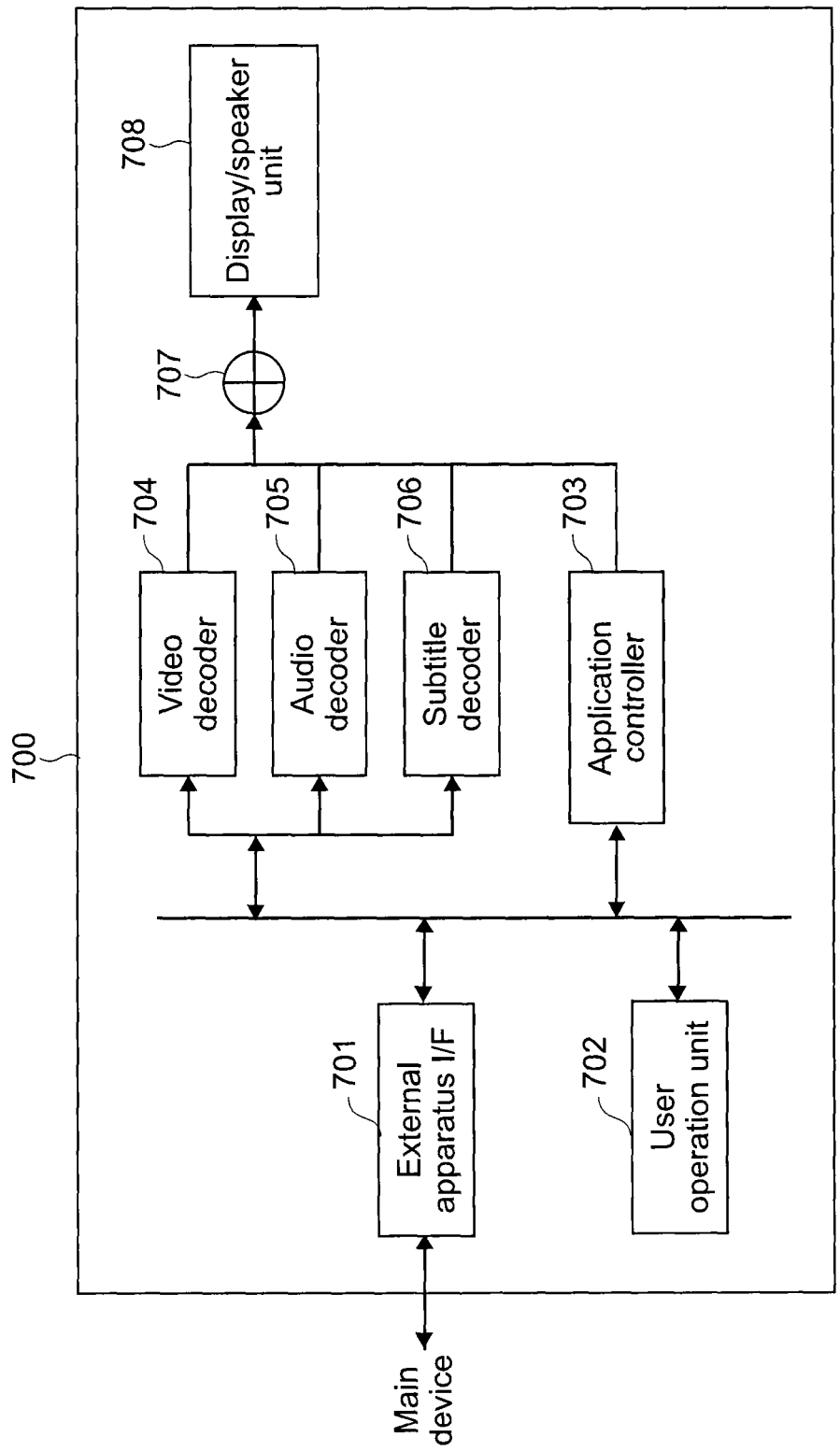
FIG. 8 A block diagram showing a configuration of an external device (second information processing apparatus) according to this embodiment.

FIG. 8 is a block diagram showing a configuration of the second information processing apparatus 700.

The second information processing apparatus 700 includes an external apparatus interface 701, a user operation unit 702, an application controller 703, a video decoder 704, an audio decoder 705, a subtitle decoder 706, an output processing unit 707, and a display/speaker unit 708.

The external apparatus interface 701 is an interface for connecting to the first information processing apparatus 500.

The user operation unit 702 serves as an input apparatus that receives inputs of data, operation commands, and the like from the user.

The video decoder 704 decodes a video ES to generate video signals and outputs the generated video signals to the output processing unit 707. The audio decoder 705 decodes an audio ES to generate audio signals and outputs the generated audio signals to the output processing unit 707. The subtitle decoder 706 decodes a subtitle ES to generate subtitle signals and outputs the generated subtitle signals to the output processing unit 707.

The output processing unit 707 combines the video signals from the video decoder 704, the audio signals from the audio decoder 705, the subtitle signals from the subtitle decoder 706, and the video signals, the audio signals, and the like from the application controller 703 and outputs them to the display/speaker unit 708.

The application controller 703 is a controller that performs processing relating to control of applications.

Some or all of the components at least including the application controller 703 of the second information processing apparatus 700 can be provided by a computer including a central processing unit (CPU) and a memory and by programs.

[Operations of Information Processing System 1]

Next, operations of the information processing system 1 according to this embodiment will be described.

Note that, descriptions of the operations will be made in the following order:

1. Start and End of Application
2. Transfer of Application to External Device
3. Management of Validity Period of Application.

(1. Start and End of Application)

Figure 9:
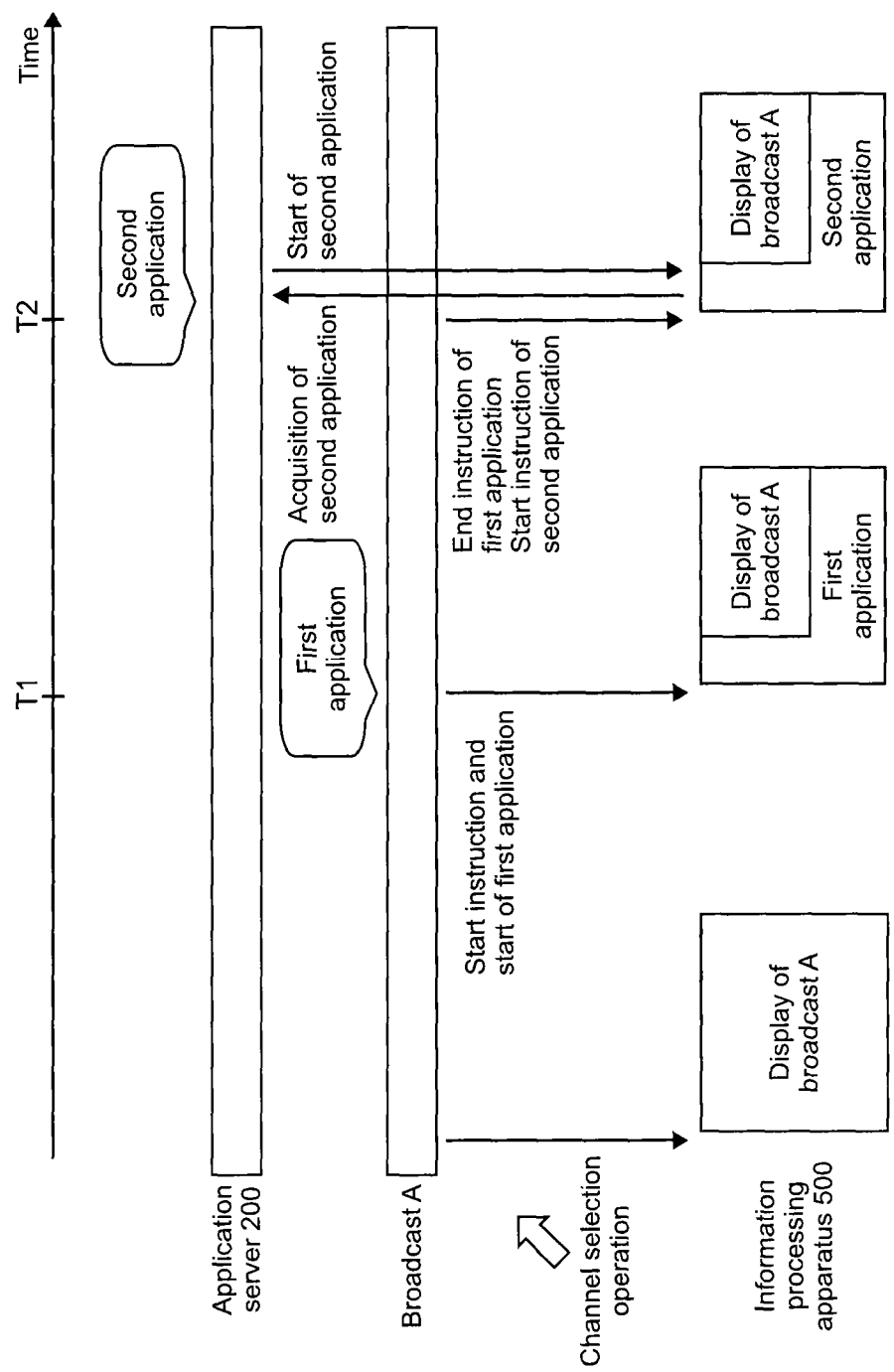
FIG. 9 A view showing an operation example of start and end of an application.

FIG. 9 is a view showing an operation example of the start and end of an application.

Figure 10:
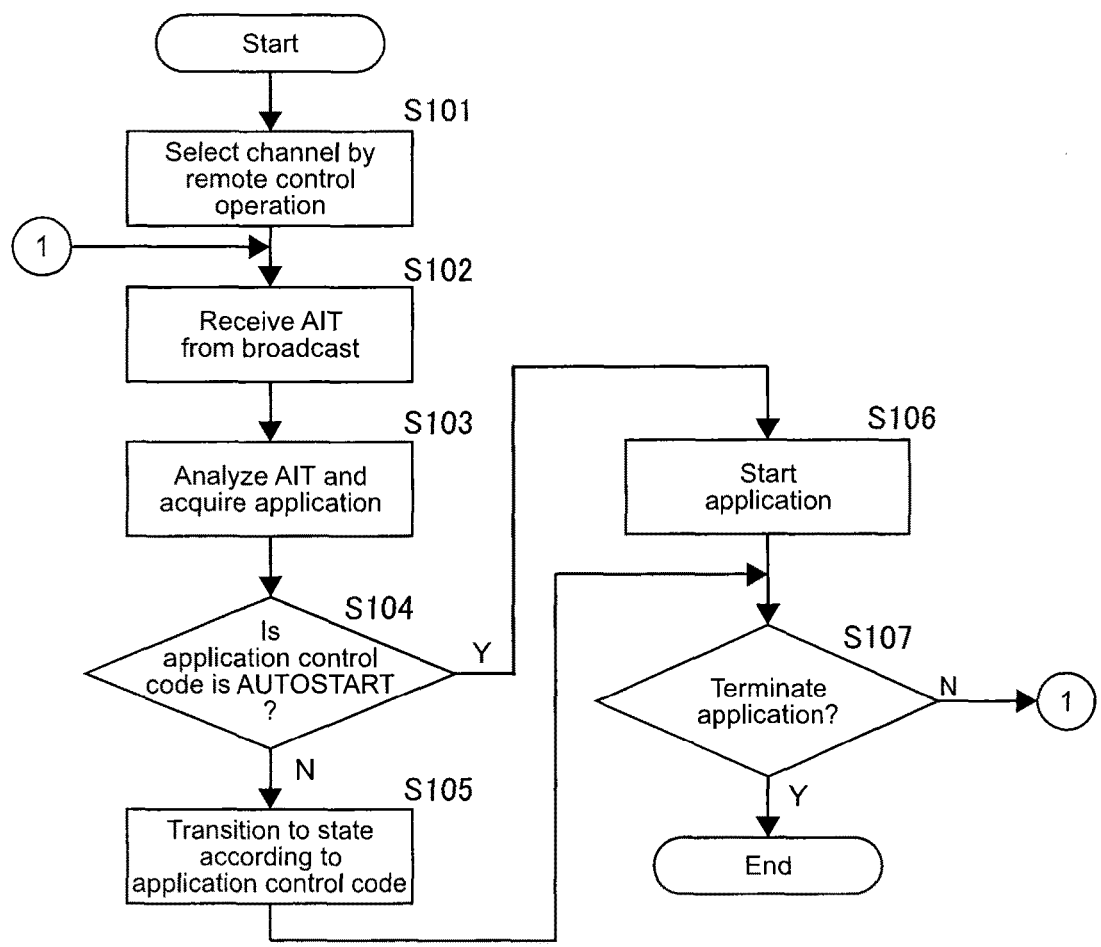
FIG. 10 A flowchart relating to processing of the start and end of the application.

FIG. 10 is a flowchart relating to processing of the start and end of the application by the first information processing apparatus 500.

The first information processing apparatus 500 receives broadcast content (broadcast A) from the broadcast station 600 selected by the user using a remote controller, for example. The first information processing apparatus 500 performs decode processing or the like of video data, audio data, subtitle data, and the like and outputs the broadcast content (broadcast A) to the display unit and the speaker unit that are connected to the first information processing apparatus 500 (Step S101).

Specifically, the broadcast interface 501 receives digital broadcast signals of the broadcast content (broadcast A) from the broadcast station 600 selected by the user and outputs a transport stream obtained by subjecting them to demodulating processing or the like to the demultiplexer 502. The demultiplexer 502 demultiplexes, from the transport stream, the stream packets of the broadcast content and further demultiplexes the stream packets of the broadcast content into a video ES, an audio ES, and a subtitle ES. The demultiplexed video ES, audio ES, and subtitle ES are decoded by the video decoder 504, the audio decoder 505, and the subtitle decoder 506, respectively. The decoded video ES, audio ES, and subtitle ES are combined by the output processing unit 503 and output to the display unit and the speaker unit.

In this example, it is assumed that, from the broadcast station 600 at a point of time T1, an application (hereinafter, referred to as "first application") and an AIT relating this first application are superimposed on the broadcast content and broadcast. It is assumed that the application control code of "AUTOSTART" indicating the start of the first application is stored in this AIT.

The demultiplexer 502 demultiplexes, from the transport stream, packets of the first application and packets of the AIT and provides them to the application controller 508. When acquiring the AIT (Step S102), the application controller 508 acquires the first application based on this AIT (Step S103). Subsequently, the application controller 508 starts the first application according to the application control code of "AUTOSTART" described in this AIT (Y in of Step S104, and Step S105). The started first application is visualized as a window superimposed on video of the broadcast content A displayed on the display unit, for example.

It is assumed that, subsequently, from the broadcast station 600 at a point of time T2, a new AIT including an application control code of "DESTROY" or "KILL" indicating the end of the first application and an application control code of "AUTOSTART" indicating the start of another application (hereinafter, referred to as "second application") is superimposed on the broadcast content and broadcast.

When acquiring the new AIT (Step S102), the application controller 508 of the first information processing apparatus 500 terminates the first application according to "DESTROY" or "KILL" stored in this AIT as the application control code with respect to the first application (N in Step S104, Step S106, and Step S107) and acquires the second application according to "AUTOSTART" stored in this AIT as the application control code with respect to the second application (Step S103). The application controller 508 of the first information processing apparatus 500 starts the second application (Step S105). Note that, for example, information on a communication protocol and location information, which are necessary for accessing the application server 200 and acquiring the second application are set in this AIT.

(2. Transfer of Application to External Device)

Next, application transfer processing to the external device in the information processing system 1 according to this embodiment will be described.

The application transfer processing to the external device is processing of transferring an application acquired by the first information processing apparatus 500 from a broadcast or communication to the second information processing apparatus 700 that is connected to the first information processing apparatus 500 as the external device.

In order to support such processing, as shown in FIG. 3, an application destination descriptor (Application_destination_discriptor) that is information for specifying a corresponding device of an application is newly defined in the application descriptor 12 of the AIT.

Figure 11:
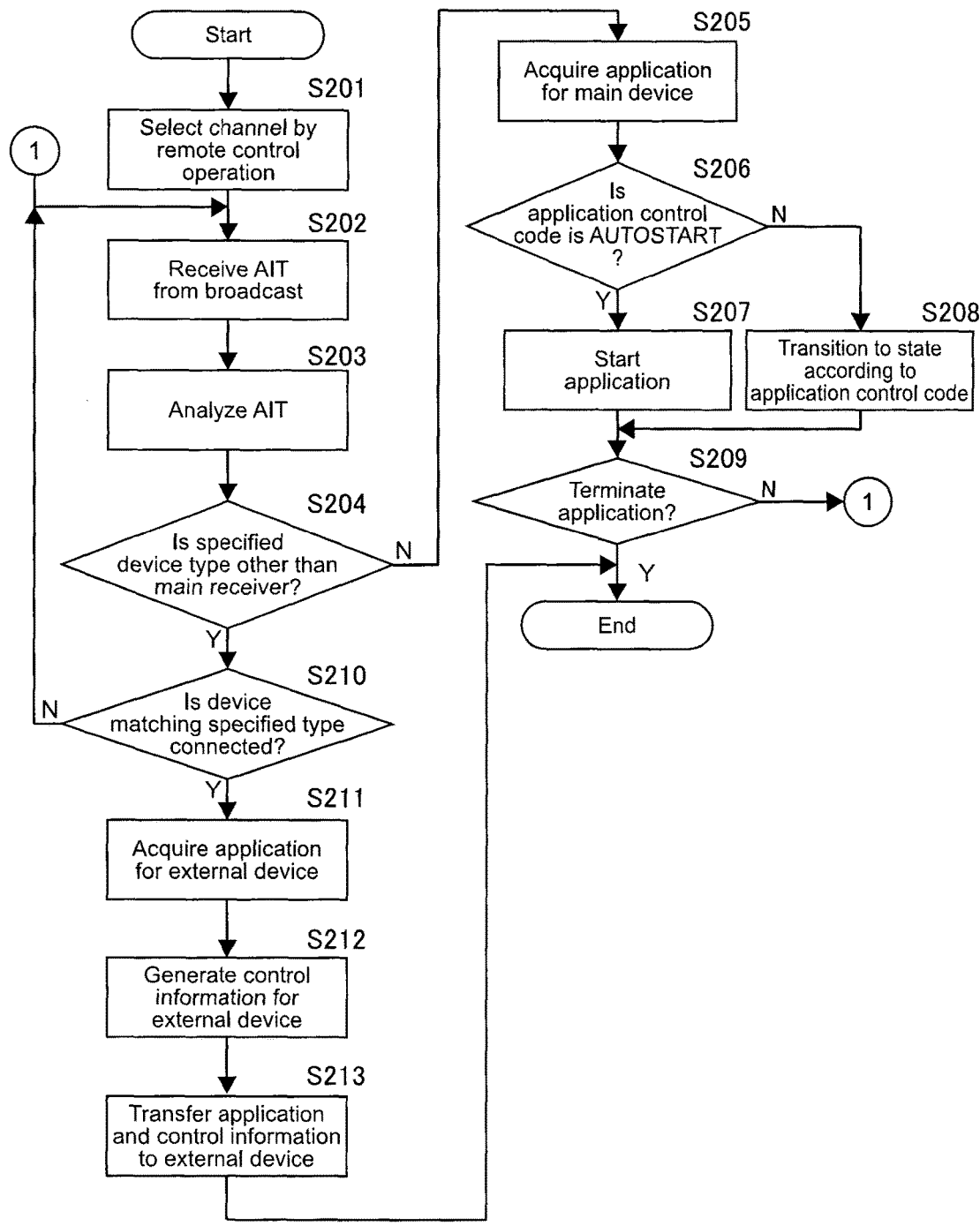
FIG. 11 A flowchart relating to application transfer processing to the external device.

FIG. 11 is a flowchart relating to the application transfer processing to the external device by the first information processing apparatus 500.

It is assumed that the second information processing apparatus 700 is connected to the first information processing apparatus 500 being the main device, as the external device. It is assumed that the first information processing apparatus 500 has acquired a device type identifier, by which a device type of the second information processing apparatus 700 can be identified, in connection processing with the second information processing apparatus 700 connected thereto, and stored it.

The application controller 508 of the first information processing apparatus 500 acquires an AIT from a broadcast wave selected (Step S201) according to a remote control operation or the like made by the user (Step S202) and analyzes this (Step S203).

Referring to the device type described in the application destination descriptor (FIG. 3) of the acquired AIT, the application controller 508 determines whether or not the application specified by the AIT is an application for the main device or an application for the external device (Step S204). At this time, if the device type is "main receiver," it is determined that the application is the application for the main device. Otherwise, if the device type is other than "main receiver," it is determined that the application is the application for the external device. The application for the main device means, for example, a program or the like created corresponding to an environment such as an operating system and a screen size of the main device, and can also be referred to as an application corresponding to the main device. The application for the external device means, for example, a program or the like created corresponding to an environment such as an operating system and a screen size of the external device, and can also be referred to as an application corresponding to the external device.

If the application is the application for the main device (N in Step S204), the application controller 508 acquires the application specified by the AIT and loads the application into the memory (Step S205), and performs a control of the start, the end, or the like of the application according to the application control code described in the AIT (Steps S206 to S209).

Note that, if the application control code described in the AIT is an application control code (end, state transition, or the like) with respect to the currently executed application for the main device, the processing of acquiring the application for the main device (Step S205) is skipped.

Otherwise, if the application is the application for the external device (Y in Step S204), the application controller 508 determines whether or not the external device of the device type specified by the AIT is connected (Step S210). The first information processing apparatus 500 has already acquired the device type identifier of the second information processing apparatus 700 in the connection processing of the second information processing apparatus 700, and hence the application controller 508 is capable of immediately comparing the device type identifier of the second information processing apparatus 700 with the device type specified by the AIT, to thereby determine whether or not the external device of the device type specified by the AIT is connected.

If it is determined that the external device of the device type specified by the AIT is not connected (N in Step S210), the application controller 508 waits for arrival of a next AIT without doing anything. If the external device of the device type specified by the AIT is connected (Y in Step S210), the application controller 508 stores the application for the external device that is specified by the AIT in the cash buffer 509 or the like (Step S211). Then, the application controller 508 converts the application control code described in the AIT into control information in a format executable when being interpret in the environment such as the operating system of the second information processing apparatus 700 (Step S212). Then, the application controller 508 transfers the control information converted into the application for the external device that is stored in the cash buffer 509 or the like to the second information processing apparatus 700 (Step S213).

Note that, if the AIT including the application control code (e.g., end) with respect to the application already transferred to the external device (second information processing apparatus 700) is acquired by the application controller 508, the processing of acquiring the application for the external device (Step S211) is skipped and only the control information is transferred to the external device (second information processing apparatus 700).

Next, referring to FIG. 12, an operation example of the transfer of the application to the external device will be described.

First, the first information processing apparatus 500 receives a broadcast content (broadcast A) from the broadcast station 600 selected by the user using the remote controller, for example. The first information processing apparatus 500 performs decode processing or the like of video data, audio data, subtitle data, and the like and outputs the broadcast content (broadcast A) to the display unit and the speaker unit that are connected to the first information processing apparatus 500.

In this example, it is assumed that, from the broadcast station 600 at the point of time T1, the application for the main device and the AIT relating to the application for the main device are superimposed on the broadcast content and broadcast. The application control code of "AUTOSTART" indicating the start of the application for the main device is stored in this AIT. In the application destination descriptor (Application_destination_discriptor), "main receiver" is specified as the device type.

When acquiring the AIT from a broadcast wave, the application controller 508 loads the acquired application for the main device into the memory of the first information processing apparatus 500 because "main receiver" is specified as the device type of the AIT. Then, the application controller 508 starts the application for the main device according to the application control code of "AUTOSTART" described in the AIT. The started application for the main device is visualized as a window superimposed on video of the broadcast content A displayed on the display unit, for example.

It is assumed that, subsequently, from the broadcast station 600 at the point of time T2, a new AIT including an application control code of "DESTROY" or "KILL" indicating the end of the application for the main device and an application control code of "AUTOSTART" indicating the start of the application for the external device, and further including "portable device" specified as the device type in the application destination descriptor (Application_destination_discriptor) is superimposed on the broadcast content and broadcast.

When acquiring the new AIT, the application controller 508 of the first information processing apparatus 500 terminates the application for the main device according to "DESTROY" or "KILL" stored in the AIT as the application control code with respect to the application for the main device.

In addition, "portable device" is specified as the device type of the application for the external device in this AIT, and hence the application controller 508 compares this with the device type identifier of the second information processing apparatus 700. Here, it is assumed that the device type identifier of the second information processing apparatus 700 is also "portable device" and thus the same as the device type specified by the AIT. In this case, the application controller 508 acquires the application for the external device based on this AIT and stores the application in the cash buffer 509 or the like.

Figure 12:
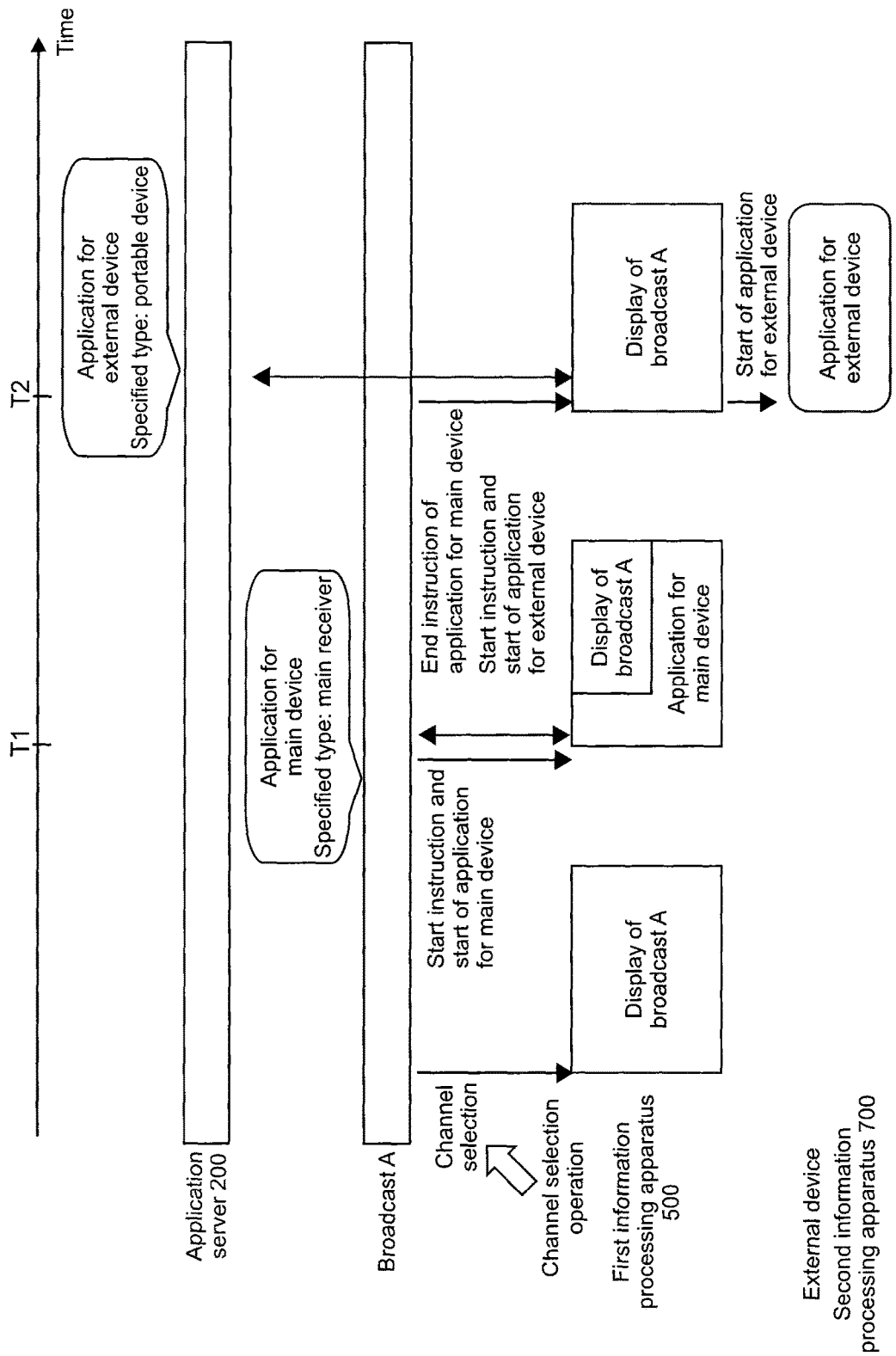
FIG. 12 Explaining an operation example of application transfer to the external device.

Note that, in the operation example in FIG. 12, the case where the application for the external device is acquired from the application server 200 by downloading is assumed. In this case, in the AIT, there is described information necessary for acquiring a file of the application for the external device by downloading from the application server 200 (e.g., communication protocol information such as hypertext transfer protocol (HTTP) and location information such as uniform resource locator (URL). Alternatively, information necessary for acquiring the XML-AIT for managing the life cycle of the application for the external device by downloading from the application server 200 may also be described in the AIT.

Next, the application controller 508 generates, based on the application control code described in the AIT "AUTOSTART," control information in a format executable when being interpret under the environment such as the operating system of the second information processing apparatus 700. Then, the application controller 508 transfers the application for the external device stored in the cash buffer 509 and the generated control information to the second information processing apparatus 700.

The second information processing apparatus 700 loads the application for the external device transferred by the first information processing apparatus 500 into the memory, and starts the application for the external device according to the control information. More specifically, the second information processing apparatus 700 receives the application for the external device and the control information thereof from the first information processing apparatus 500 via the external apparatus interface 701. The application controller 703 of the second information processing apparatus 700 loads the received application for the external device into the memory. In accordance with the incorporated operating system, the application controller 703 of the second information processing apparatus 700 interprets the control information and performs a control of the start or the like of the application for the external device.

(3. Management of Validity Period of Application)

Next, management of the validity period of the application in the information processing system 1 according to this embodiment will be described.

The management of the validity period of application means management of validity periods of applications present in the first information processing apparatus 500. This management has a purpose for deleting an application, the validity period of which has expired, from the first information processing apparatus 500 or urges the user to delete it irrespective of its state (being executed, being temporarily stopped, and being stopped).

In order to support such processing, as shown in FIG. 5, an application validity period descriptor (Application_validity_period_descriptor) for specifying a date of termination of a period when an application is usable is newly defined in the application descriptor 12 of the AIT.

Figure 13:
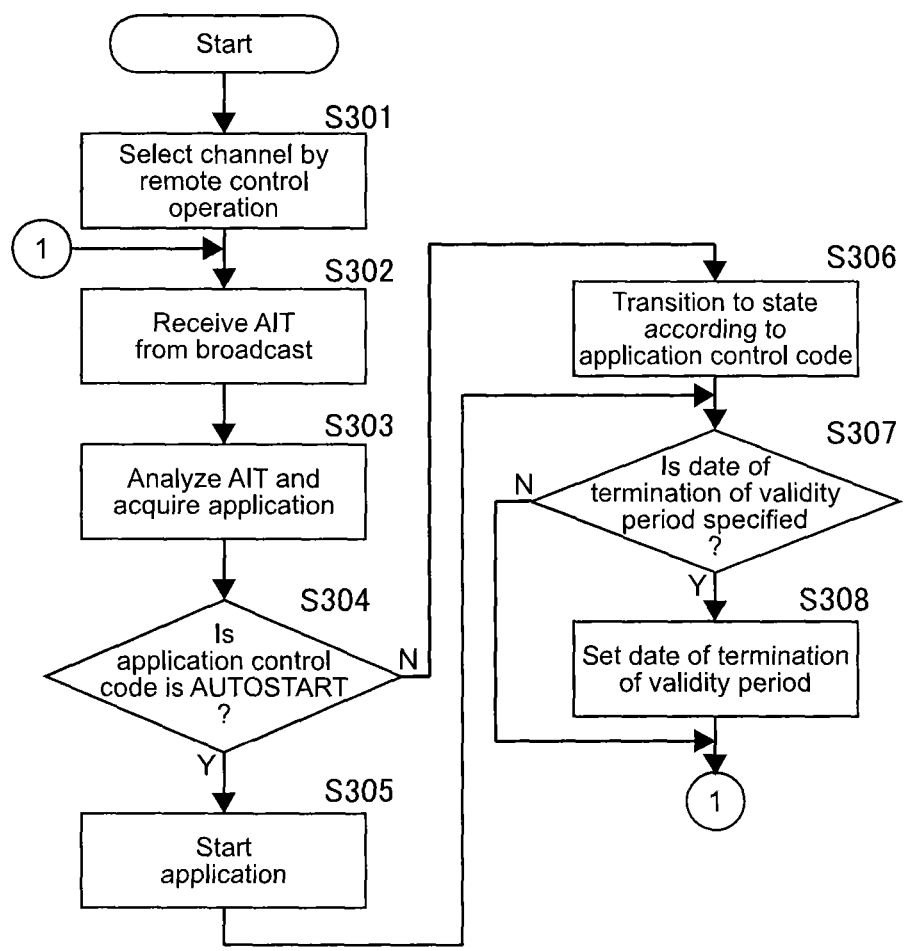
FIG. 13 A flowchart relating to registration of a date of termination of a validity period in management of the validity period of the application.
Figure 14:
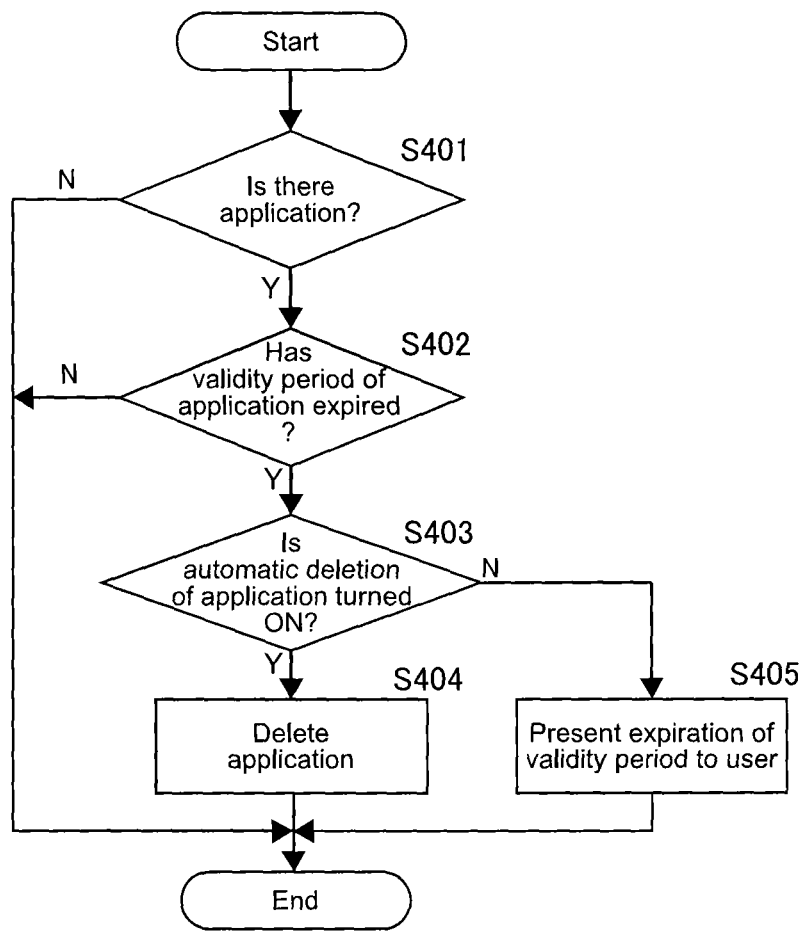
FIG. 14 A flowchart relating to deletion of the application based on the management of the validity period of the application.

FIGS. 13 and 14 are flowcharts relating to processing of the management of the validity period of the application in the information processing system 1 in FIG. 1.

Processing in Steps S301 to S306 in the processing of the management of the validity period of the application are the same as the processing in Steps S101 to S106 in FIG. 10 in (1. Start and End of Application) above, and hence descriptions thereof will be omitted.

The application controller 508 of the first information processing apparatus 500 performs a control of the start, the state transition, or the like of the application according to the application control code described in the AIT (Steps S305 and S306), and then performs processing as follows.

The application controller 508 determines whether or not the application validity period descriptor is described in the acquired AIT (Step S307). If the application validity period descriptor is described (Y in Step S307), the application controller 508 sets a date of termination of the validity period, which is indicated by the application validity period descriptor, with respect to the application (Step S308). Specifically, the application controller 508 stores information with identifiers of respective acquired applications being associated with their date of termination of the validity period, in the storage unit such as the cash buffer 509.

As shown in FIG. 14, the application controller 508 performs processing as follows based on the information with the identifiers of the applications being associated with the dates of termination of the validity period, which is stored in the storage unit, periodically, for example, every time when a predetermined period of time elapses or every time when the first information processing apparatus 500 is powered on.

The application controller 508 determines an application present in the first information processing apparatus 500 (Step S401). Here, the application present in the first information processing apparatus 500 means an application stored in the first information processing apparatus 500 irrespective of its state, for example, being executed, being temporarily stopped, or being stopped. More specifically, the application present therein is stored in the cash buffer 509 and the application being executed and the application being temporarily stopped are stored in the memory.

If no application is present, the application controller 508 terminates the processing without doing anything. If the application is present, the application controller 508 determines whether or not the validity period of the application has expired by comparing the date of termination of the validity period of the application with current date and time (Step S402). If the validity period has not expired, the application controller 508 similarly makes a determination as to whether or not a validity period of a next application has expired.

The application controller 508 enables the user to set, in advance, a deletion processing method performed if the application, the validity period of which has expired, is detected. If the application, the validity period of which has expired, is found, the application controller 508 performs processing of deleting the application according to the deletion processing method set by the user or the like in advance. For example, examples of the deletion processing method includes a method of indicating, if such an application is found, the expiration of the validity period of the application to the user by display or the like and actually deleting the application in response to a check operation by the user, and a method of deleting the application without the check by the user.

Next, referring to FIG. 15, an operation example of processing of the management of the validity period of the application will be described.

First, the first information processing apparatus 500 receives broadcast content (broadcast A) from the broadcast station 600 selected by the user using the remote controller, for example. The first information processing apparatus 500 performs decode processing of video data, audio data, subtitle data, and the like, and outputs the broadcast content (broadcast A) to the display unit and the speaker unit that are connected to the first information processing apparatus 500.

In this example, it is assumed that, from the broadcast station 600 at the point of time T1, an application (hereinafter, referred to as "first application") and an AIT relating to this first application are superimposed on the broadcast content and broadcast. It is assumed that an application control code of "AUTOSTART" indicating the start of the first application is stored in this AIT and "Time X" is specified in the application validity period descriptor (Application_validity_period_descriptor) as a date of termination of a period when the application is usable.

When acquiring the AIT, the application controller 508 starts the first application according to the application control code of "AUTOSTART" described in the AIT. Further, the application controller 508 generates information with "Time X" described as the application validity period descriptor in the acquired AIT being associated with an identifier of the first application and stores this information in the storage unit such as the cash buffer 509.

It is assumed that, subsequently, from the broadcast station 600 at the point of time T2, an AIT including an application control code of "DESTROY" or "KILL" indicating the end of the first application and relating to another application (hereinafter, referred to as the "second application") is superimposed on the broadcast content and broadcast. In this AIT, an application control code of "AUTOSTART" indicating the start of the second application is stored and "Time Y" is specified as the application validity period descriptor.

When acquiring this new AIT, the application controller 508 of the first information processing apparatus 500 terminates the first application according to "DESTROY" or "KILL" stored in this AIT as the application control code with respect to the first application, and acquires the second application according to "AUTOSTART" stored in this AIT as the application control code with respect to the second application and starts this (Step S105). Note that, in this AIT, for example, information on a communication protocol and location information, which are necessary for accessing the application server 200 and acquiring the second application, are set. Further, the application controller 508 generates information with the application validity period descriptor OF "Time Y" described in the acquired AIT being associated with an identifier of the second application and stores this information in a storage unit such as the cash buffer 509.

The application controller 508 determines the application, the validity period of which has expired, based on a relationship between the identifier of the application and the date of termination of the validity period, which is stored in the storage unit such as the cash buffer 509, and deletes the application or presents the expiration of the validity period to the user. Specifically, the application controller 508 determines the first application as the application, the validity period of which has expired, when the current date and time become "Time X," and determines the second application as the application, the validity period of which has expired, when the current time and date become "Time Y," and performs processing of deleting them or the like.

[Effects, etc. of Embodiment]

As described above, in this embodiment, it is possible to extend the control of the applications by the AIT.

In particular, in this embodiment, the application destination descriptor (Application_destination_discriptor) for specifying the corresponding device of the application is newly defined in the application descriptor of the AIT. Based on the application destination descriptor, the first information processing apparatus 500 is capable of determining whether or not the application is the application for its own device and the application for the external device, and transferring the application to the external device to start it if the application is the application for the external device.

Further, in this embodiment, the application validity period descriptor (Application_validity_period_descriptor) for specifying the date of termination of the period when the application is usable is newly defined in the application descriptor of the AIT. Based on the application validity period descriptor, the first information processing apparatus 500 is capable of managing the validity periods of the applications present in its own apparatus and deleting the application, the validity period of which has expired, for example.

Modified Examples, Etc.

Note that, in the management of the validity period of the application according to the above-mentioned embodiment, the application, the validity period of which has expired, is deleted or the user is urged to delete it irrespective of its state (being executed, being temporarily stopped, or being stopped). However, different processing may be performed depending on its state. For example, the application being temporarily stopped or being stopped may be deleted or a notice may be issued to the user immediately, and the application being executed may be deleted or a notice may be issued to the user after the application may be terminated by an operation or the like by the user.

Further, in the management of the validity period of the application described above, the date of termination of the validity period can be defined in the AIT. However, a modification in which a relative time is defined is also conceivable.

Figure 15:
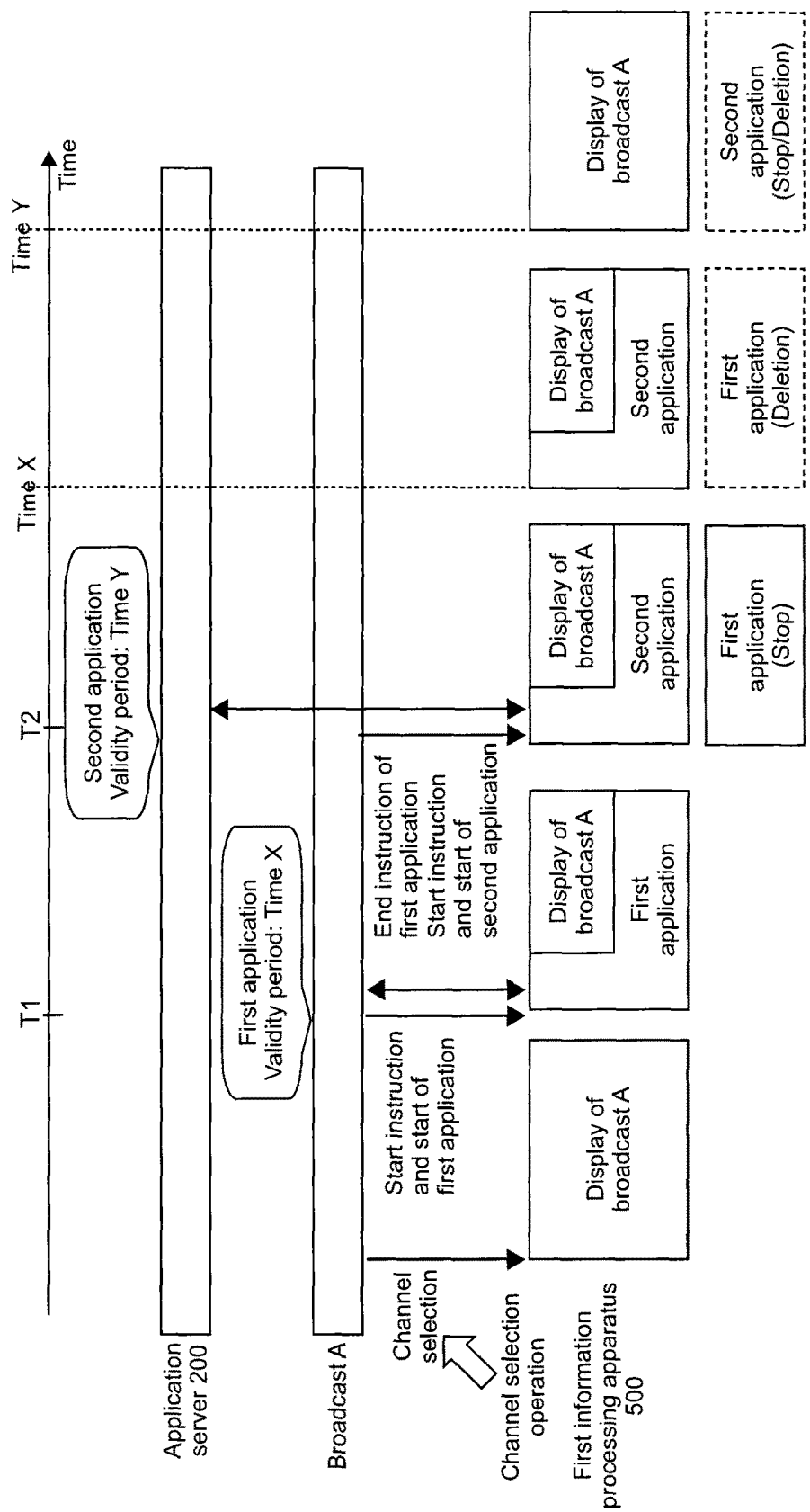
FIG. 15 Explaining an operation example of processing of the management of the validity period of the application.

In the operation examples in FIGS. 9, 12, and 15, the case where the second application (application for external device) is acquired by the application server 200 has been described. However, the second application may be acquired from a broadcast.

Although the embodiment has been described assuming that HbbTV as a standard, the present technology is not necessarily limited to assume the HbbTV as a standard.

In addition, it is needless to say that the present technology is not limited only to the above-mentioned embodiment and various changes can be added without departing from the gist of the present invention.

It should be noted that the present technology may also take the following configurations.

(1) An information processing apparatus, including:
a connector that is connectable to an external device;
a broadcast content processing unit that receives and processes broadcast content; and
a controller that acquires an application information table in which an application destination descriptor for specifying a corresponding device of an application related to the broadcast content is set, and determines based on the application destination descriptor whether or not the application is an application corresponding to the external device connected to the connector.

(2) The information processing apparatus according to (1), in which
the controller transfers, when determining that the application is the application corresponding to the external device, the application to the external device connected to the connector.

(3) The information processing apparatus according to (1) or (2), in which
the controller converts, when determining that the application is the application corresponding to the external device, an application control code described in the acquired application information table into external device control information in a format executable when being interpret in an environment of the external device, and transfers the converted application control code to the external device together with the application.

(4) The information processing apparatus according to any one of (1) to (3), in which
the controller acquires an application information table in which an application validity period descriptor for specifying a validity period of the application is set, and manages the validity period of the application based on the application validity period descriptor.

DESCRIPTION OF REFERENCE NUMERALS

1 information processing system
10 AIT
200 application server
500 first information processing apparatus (main device)
501 broadcast interface
502 demultiplexer
503 output processing unit
504 video decoder
505 audio decoder
506 subtitle decoder
507 communication interface
508 application controller
509 cash buffer
510 external apparatus interface
600 broadcast station
700 second information processing apparatus (external device)
701 external apparatus interface
703 application controller

The invention claimed is:

1. An information processing apparatus, comprising:
a communication interface; and
circuitry configured to
receive and process audiovisual broadcast content;
acquire an application information table in which an application destination descriptor for specifying a device type of an application to be executed concurrently with the audiovisual broadcast content is set;
determine whether the application destination descriptor indicating the device type of the application corresponds to the information processing apparatus or corresponds to an external device;

in response to a determination that the device type of the application corresponds to the information processing apparatus, execute the application concurrently with the audiovisual broadcast content; and in response to a determination that the device type of the application corresponds to the external device, transfer, via the communication interface, the application to the external device.

2. The information processing apparatus according to claim 1, wherein the circuitry is configured to convert, when the device type of the application is determined to correspond to the external device, an application control code described in the acquired application information table into external device control information in a format executable by the external device, and transfer, via the communication interface, the converted application control code to the external device together with the application.

3. The information processing apparatus according to claim 2, wherein the circuitry is configured to acquire the application information table in which an application validity period descriptor for specifying a validity period of the application is set, and manage the validity period of the application based on the application validity period descriptor.

4. The information processing apparatus according to claim 3, wherein the circuitry is configured to perform processing for deleting the application, the validity period of which has expired.

5. The information processing apparatus according to claim 1, wherein the application is executed by the external device when the device type of the application corresponds to the external device.

6. The information processing apparatus according to claim 1, wherein the circuitry is configured to download the application according to the application information table.

7. The information processing apparatus according to claim 1, wherein the circuitry is configured to execute the application according to the application information table when the device type of the application is determined to correspond to the information processing apparatus.

8. The information processing apparatus according to claim 1, further comprising:

a display, wherein the circuitry is configured to output video of the processed broadcast content to the display.

9. The information processing apparatus according to claim 1, wherein the circuitry is configured to in response to a determination that the device type of the application corresponds to the information processing apparatus, acquire the application from an application server and execute the application concurrently with the audiovisual broadcast content;

in response to a determination that the device type of the application corresponds to the external device, determine whether the external device is connected to the information processing apparatus; and in response to a determination that the device type of the application corresponds to the external device and the external device is connected to the information processing apparatus, transfer, via the communication interface, the application to the external device.

10. An information processing method, comprising:

receiving and processing audiovisual broadcast content;

acquiring, by circuitry of an information processing apparatus, an application information table in which an application destination descriptor for specifying a device type of an application to be executed concurrently with the audiovisual broadcast content is set;

determining, by the circuitry, whether the application destination descriptor indicating the device type of the application corresponds to the device type of the information processing apparatus or corresponds to an external device;

in response to a determination that the device type of the application corresponds to the information processing apparatus, executing the application concurrently with the audiovisual broadcast content; and in response to a determination that the device type of the application corresponds to the external device, transferring, via the communication interface, the application to the external device.

11. The information processing method according to claim 10, wherein the application is executed by the external device when the device type of the application corresponds to the external device.

12. A non-transitory computer-readable medium storing instructions which when executed by a computer cause the computer to:

acquire an application information table in which an application destination descriptor for specifying a device type of an application to be executed concurrently with audiovisual broadcast content is set;

determine whether the application destination descriptor indicating the device type of the application corresponds to the device type of the computer or corresponds to an external device;

in response to a determination that the device type of the application corresponds to the computer, execute the application concurrently with the audiovisual broadcast content; and in response to a determination that the device type of the application corresponds to the external device, transfer the application to the external device.

13. The non-transitory computer-readable medium according to claim 12, wherein the application is executed by the external device when the device type of the application corresponds to the external device.

* * * * *